United States Patent [19]
Smith

[11] Patent Number: 5,794,461
[45] Date of Patent: *Aug. 18, 1998

[54] KEY OPERABLE RESTRAINING DEVICE

[75] Inventor: Jerry R. Smith, Littleton, Colo.

[73] Assignee: The McKinley Group, Golden, Colo.

[*] Notice: The term of this patent shall not extend beyond the expiration date of Pat. No. 5,377,510.

[21] Appl. No.: 543,199

[22] Filed: Oct. 13, 1995

[51] Int. Cl.⁶ ..................................................... E05B 75/00
[52] U.S. Cl. ............................... 70/16; 70/14; 292/318
[58] Field of Search .................................. 70/18, 15, 16, 70/DIG. 9, 14; 292/318, 319

[56] References Cited

U.S. PATENT DOCUMENTS

| | | |
|---|---|---|
| 381,005 | 4/1888 | Ferrell et al. . |
| 1,462,238 | 7/1923 | Mennillo . |
| 3,933,015 | 1/1976 | Balicki . |
| 4,287,644 | 9/1981 | Durnad .................. 24/16 PB |
| 4,287,731 | 9/1981 | Kruger . |
| 4,306,745 | 12/1981 | Wenk ........................ 292/318 |
| 4,424,994 | 1/1984 | Dowden .................... 292/318 |
| 4,506,415 | 3/1985 | Swift ........................ 24/16 PB |
| 4,574,600 | 3/1986 | Moffett ........................ 70/16 |
| 4,909,051 | 3/1990 | Lee . |
| 4,910,831 | 3/1990 | Bingold . |
| 5,088,158 | 2/1992 | Burkholder . |
| 5,099,662 | 3/1992 | Tsai . |
| 5,159,728 | 11/1992 | Bingold . |
| 5,193,254 | 3/1993 | Geisinger . |
| 5,377,510 | 1/1995 | Smith . |

Primary Examiner—Rodney M. Lindsey
Assistant Examiner—Tuyet-Phuong Pham
Attorney, Agent, or Firm—Timothy J. Martin; Michael R. Henson

[57] ABSTRACT

A key operated restraining device is provided to create a securing loop of adjustable dimension. The device comprises a locking head portion, an elongated strap insertable into the locking head portion to form a securing loop of adjustable dimension, a support block disposed in the interior of the head portion, and a pawl member. Both the support block and the pawl member terminate in a spaced relation to an interior wall surface of the head portion and form a slideway for the strap portion. The pawl member is connected to the locking head by a resilient hinge structure biasing the pawl member into a locking position wherein the locking structure is operative to lockably engage a plurality of tooth structures on the strap portion and a release position wherein the locking structure is disengaged from the tooth structures.

10 Claims, 4 Drawing Sheets

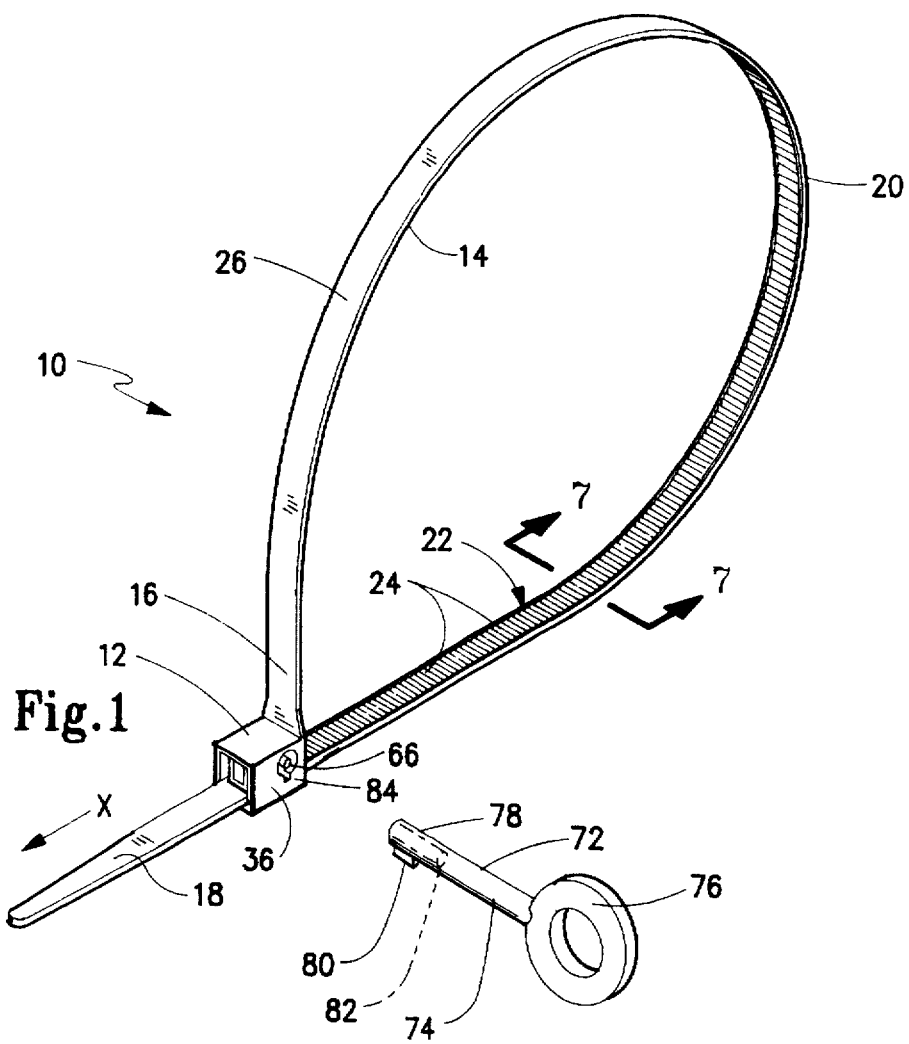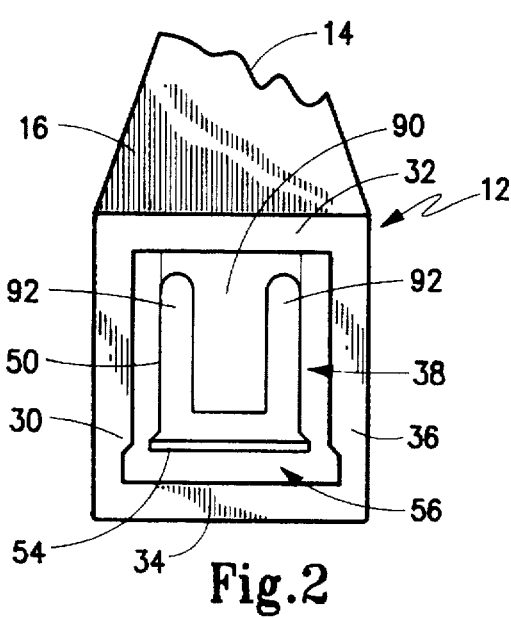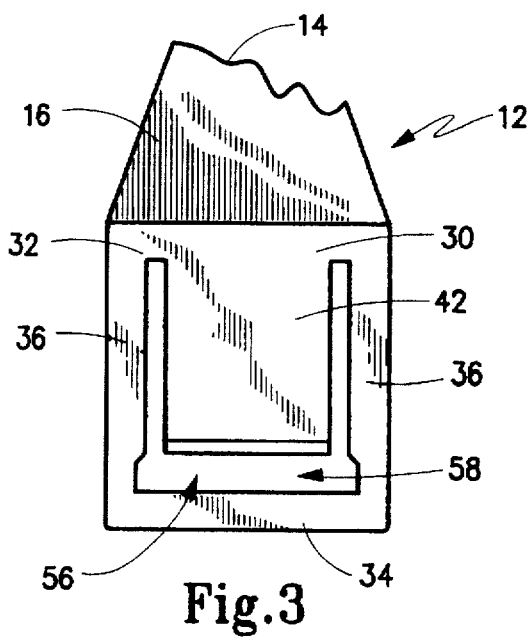

KEY OPERABLE RESTRAINING DEVICE

FIELD OF THE INVENTION

The present invention broadly relates to tying devices which can be used to secure objects together. More specifically, the present invention relates to tying devices known as "cable ties" especially as they are employed as wrist and leg cuffs.

BACKGROUND OF THE INVENTION

The need to quickly and temporarily restrain individuals taken into custody by peace officers has long been known. This, of course, is necessary both to prevent escape of those persons while being transported to detention facilities as well as to reduce the likelihood of injury to law enforcement personnel after taking an individual into custody. Traditionally, steel handcuffs have been employed for this purpose. Here, as is known, the standard steel handcuff device includes a pair of lockable rings which extends around the wrists or ankles of a person with these rings being secured together by a short length of chain.

Due to the expense and bulkiness of traditional metal handcuffs, however, various law enforcement and peace keeping agencies have sought out replacement devices which can be used as temporary restraints on persons taken into custody. One such device which is received significant interest is the traditional cable tie which is a device used to bind objects together in a bundle or for other similar purposes. The traditional cable tie, of course, includes a locking head that has a relatively open interior with a locking pawl formed therein. An elongated strap extends from the locking head and can be bent upon itself to form a closed loop upon insertion through the locking head. The elongated strap has teeth running a substantial portion of its length so that the loop formed by the strap maybe reduced in size by continued insertion of the strap through the locking head. The ratcheting pawl locks against these teeth to prevent withdrawal of the strap upon insertion or otherwise to prevent expansion of the dimension of the loop.

Cable ties have a number of distinct advantages when used to secure objects. Cable ties can accommodate bundles of varying sizes and shapes. Also, because the loop which secures the objects is not formed until the user inserts the free end of the strap through the locking head, there is no need to position an object through an already closed loop. Rather, the strap may simply be trained around the object to be secured and the free end is then easily attached by simply inserting the free end of the strap through the locking head. Also, cable ties have the advantage of being made of lightweight yet strong plastic material. Another advantage of cable ties over other methods of securing objects is that, after installation, the tension on the looped strap may be increased by pulling the free end of the strap tightly through the locking head. Due to the relatively small size of the ratcheting teeth on the strap and the ratchet pawl, very small incremental adjustment of tension may be obtained.

It has also been known for some time that cable ties and similar devices employing flexible straps that are adjustably looped into locks that use one way ratchets can be used as cuffs to restrain a person taken into custody. Here, the cable tie is simply looped around a person's wrists or ankles, and the loop is tightened so that the extremities are bound together thus preventing free use of the person's arms and/or legs. With respect to the arms, this is typically accomplished with the person's hands being placed behind his/her back. Law enforcement personnel have used cable ties for this purpose for some time in place of the traditional metal handcuffs because of the lightweight nature and inexpense of the cable ties.

A drawback in the use of traditional cable tie and similar ratcheting locking strap devices is that they typically can only be used a single time. Thus, in order to release a restrained person, it is necessary to cut the cable tie from the wrist and/or ankles. This, of course, destroys the usefulness of the device so that it must be replaced after every use. Moreover, during the removal operation, there is some risk of injury either to the restrained person or to the person employing the cutting instrument should the restrained individual struggle or otherwise move. Another danger in such devices is that the restrained person may either purposely or inadvertently pull on the free end of the strap thereby reducing the size of the fastening loop to an extreme that might cut-off blood circulation to the extremities. At this point, the restraining device must be removed and, if destroyed, a new device employed. This, of course, is often not convenient or even possible in most situations where restraining devices are employed.

In addition to the traditional cable tie, other restraining devices operating on the concept of free strap looped into a ratcheting lock have been developed. These include, for example, U.S. Pat. No. 4,071,023 to Gregory which includes a pair of free straps and a pair of ratcheting locks. U.S. Pat. No. 5,088,148 to Burkholder is similar to the Gregory patent, but includes a pair of ratcheting locks that are positioned on a single mount. U.S. Pat. No. 5,099,662 to Tsay includes a mechanism to release a ratchet to allow reuse of the device. U.S. Pat. No. 4,964,419 to Karriker includes a mechanism to expand and contract the cuff size.

In an effort to improve the use of cable ties as temporary restraints, I developed a key releasable restraint described in my U.S. Pat. No. 5,377,510 issued Jan. 3, 1995. In this device, a key hole and post assemble was provided in the locking head of a cable tie at such a position that, upon insertion into the locking head, a tab located on the barrel of the key could attack the ratcheting pawl in order to manipulate it into a released position allowing the restraining loop to loosen by expanding in size and even to be released by withdrawing the free end of the strap portion from the locking head. While the device shown in my earlier U.S. Patent presents substantial improvements over previous releasable cable ties, the present invention is directed to further improving releasable cable ties, especially used as restraints in law enforcement situations.

SUMMARY OF THE INVENTION

It is an object of the present invention to provide a new and useful restraint device which is inexpensive and lightweight in construction.

Another object of the present invention is to provide a restraint device that is reusable.

A further object of the present invention is to provide a restraint device of a cable-tie type which is key operable yet which exhibits improved structural integrity.

Yet another object of the present invention is to provide a restraint device of a cable-tie type which is key operated and which is structured to resist picking.

Still a further object of the present invention is to provide a restraint device of improved structure which can still be molded as an integral, one-piece fabricated article.

To accomplish these objects, then, the key operated retraining device of the present invention is adapted to create a securing loop of adjustable dimension in order to secure one or more objects, for example, to act as a releasable handcuff device for restraining persons taken into custody. Broadly, the key operated restraining device according to the present invention includes a locking head portion that has an interior, and an elongated strap has a proximal end connected to the locking head portion and extends terminate in a distal free end. A plurality of tooth structures are disposed on a first surface of the elongated strap portion, and the strap is sized so as to have a sufficient length so that the free distal end is insertable through the locking head portion to form the securing loop of adjustable dimension.

A support block is disposed in the interior of the head portion and terminates in spaced relation with respect to an interior wall surface thereof. Similarly, a pawl member is disposed in the interior of the head portion and terminates in spaced relation to the wall surface. Thus, the region between the pawl member and the interior wall surface and between the support block and the interior wall surface form a slideway that is sized for close-fitted mated engagement with the strap portion. The pawl member includes a locking structure disposed thereon so that, when the strap portion is inserted into locking head portion, the locking structure on the pawl member engages the tooth structures on the first surface of the elongated strap portion to lockably retain the strap portion therein. Thus, as the strap portion is moved in a direction to reduce the dimension of the securing loop, the locking structure engages the locking teeth in a ratchet-like manner. The pawl member is connected to the locking head by means of resilient hinge structure that biases the pawl member into a locking position to lockably engage the tooth structures on the strap portion while the hinge structure may be moved into a released position wherein the locking structure is disengaged from the tooth structure. The pawl member and the support block are, together, configured to form a keyway therebetween which is sized and adapted to receive a key therein, and the pawl member is constructed so that rotation of the key in a first rotational direction moves the pawl element from the locking position to the release position.

Preferably, the locking head portion is formed as a housing that includes an upper wall, a lower wall opposite the upper wall and a pair of opposed sidewalls which interconnect the upper and lower walls thereby to define the interior. The support block and the pawl member are then connected to the upper wall such that the slideway is defined by a region between the interior surface of the lower wall and the support block and the pawl member. The strap then extends outwardly from the upper wall. The keyway is then preferably oriented along a keyway axis that is transverse to the slideway, and the keyway may include an optional post element that is located centrally in the keyway and that extends along the keyway axis. A key hole may be provided in one of the sidewalls with this key hole being aligned with the keyway so that a key may be inserted through a sidewall to matably engage the post structure while in the keyway after which the key may be rotated in the first rotational direction to disengage the pawl member, as desired. With this structure, the support block forms a first endwall for the locking head. An optional second endwall may be provided opposite the support block so that the interior of the locking head is substantially enclosed.

It is preferred that the strap member have a second surface opposite the tooth structures which is formed as an uninterrupted planar surface. Similarly, the interior wall surface, such as the interior surface of the lower wall, may be formed in a smooth, uninterrupted plane so that the second surface of the strap portion may slidably engage the interior wall surface in a smooth, uninterrupted manner. To facilitate insertion of distal free end of the strap portion into the slideway, the region between the interior wall surface and the support block may be formed to be outwardly divergent thereby to form an enlarged entryway for the slideway.

These and other objects of the present invention will become more readily appreciated and understood from a consideration of the following detailed description of the exemplary embodiments when taken together with the accompanying drawings, in which:

BRIEF DESCRIPTION OF THE DRAWINGS

FIG. 1 is a perspective view of a key operated restraining device according to the first exemplary embodiment of the present invention;

FIG. 2 is an end view in elevation of a first end of the locking head of the key operated restraining device shown in FIG. 1;

FIG. 3 is an end view in elevation of a second end of the locking head portion of the key operated restraining device of FIG. 1;

DETAILED DESCRIPTION OF THE EXEMPLARY EMBODIMENTS

The present invention broadly relates to connecting devices of a type wherein a strap is placed around an object or objects to be secured with a free end of the strap being inserted into a locking head such that, when the loop is tightened, the strap retains the objects. The lock generally includes a ratcheting structure to engage the strap portion. Such devices are commonly referred to as "cable ties". The device according to the present invention, however, is specifically adapted for use as a restraining device such as a reusable handcuff, although the present invention should not be limited to just such applications. Moreover, the present invention is specifically directed to a key operated restraining device which is adapted to create a securing loop of adjustable dimension yet which may be key operated to release the loop for release of such objects.

Figure 7:
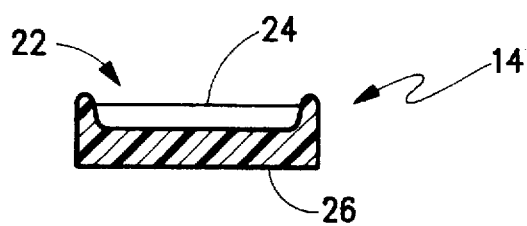
FIG. 7 is a cross-sectional view of the strap portion taken about lines 7—7 of FIG. 1.

According to the first exemplary embodiment of the present invention then, as is shown in FIGS. 1 and 7, restraining device 10 includes a locking head portion 12 and an elongated strap portion 14 which has a proximal end 16 connected to head portion 12 and a distal free end 18. A length of strap portion 14 adjacent distal free end 18 may be inserted through locking head portion 12 to form a closed securing loop 20 of a adjustable size. Strap portion 14 has a first surface 22 on which is disposed a plurality of transversely extending locking tooth structures, such as teeth 24, and a second surface 26 is located oppositely first surface 22. Surface 26 is formed as a smooth, uninterrupted planar surface to facilitate slidable engagement with locking head portion 12, as described below.

Locking head portion 12 is best shown in FIGS. 2–6 where it may be seen that locking head portion 12 is preferably in the form of a housing 30 formed by an upper wall 32, a lower wall 34 and a pair of sidewalls 36 that thus surround an interior 38. Housing 30 is generally rectangular in construction with proximal end portion 16 of strap 14 extending as an integral piece from upper wall 32.

Figure 4:
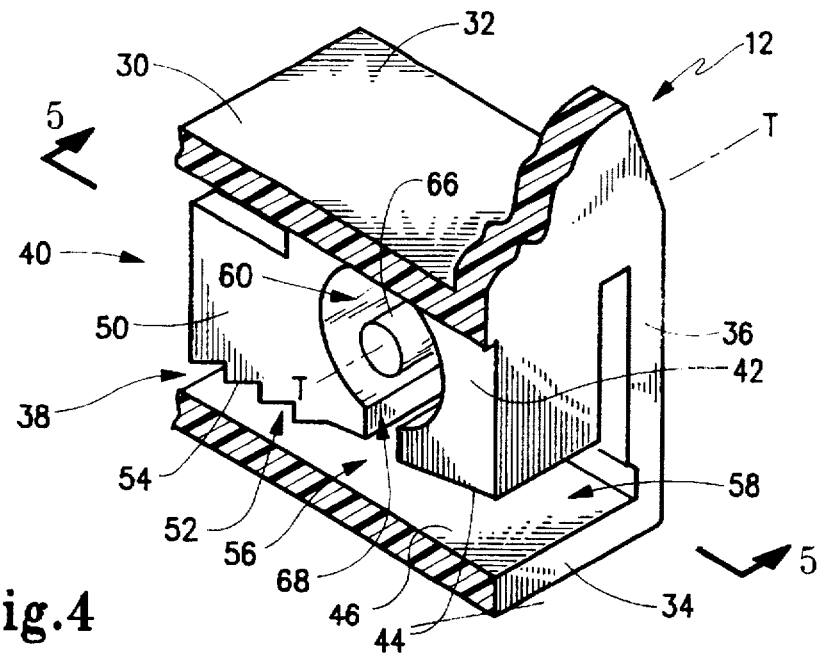
FIG. 4 is a perspective view of the locking head portion of the key operated restraining device shown in FIGS. 1–3.

With reference still to FIGS. 2–6, it may be seen that a locking mechanism 40 of a different construction than that described in my U.S. Pat. No. 5,377,510, is disposed in interior 38 of housing 30. More particularly, it may be seen that locking mechanism 40 is formed by a support block 42 that extends downwardly from upper wall 32 and terminates in a lower surface 44 that is oriented in spaced relation to an interior wall surface 46 of housing 30 as defined by an interior wall surface of lower wall 34. Similarly, locking mechanism 40 includes a pawl member 50 which extends downwardly from upper wall 32 to terminate in a lower ratcheting surface 52 that has a locking structure defined by a plurality of ratchet teeth 54. Ratcheting surface 52 is likewise in spaced relation to wall surface 46. Accordingly, the regional portions between interior wall surface 46 and, respectively, lower surface 44 of support block 42 and ratcheting surface 52 of pawl member 50 form a slideway 56 that is located alongside interior wall surface 46. To this end, interior wall surface 46 is formed as a smooth, uninterrupted planar surface. Lower surface 44 of support block 42 is formed obliquely to wall surface 46 so that this interior wall surface 46 and lower surface 44 are outwardly divergent from one another thereby to form an enlarged tapered entryway 58 for slideway 56, as is best shown in FIG. 4.

Locking mechanism 40, as defined by support block 42 and pawl member 50, includes a keyway 60 that extends transversely therethrough. Keyway 60 is formed by a first arcuate surface 62 formed on the interior side of support block 42 and a second arcuate surface 64 formed on the inner side of pawl member 50. Keyway 60 is cylindrical in shape and is oriented along a transverse axis "T", as is shown in FIG. 4. Furthermore, a transverse post 66 is oriented along axis "T" and is cylindrical in shape with keyway 60 so that keyway 60 extends concentrically therearound. A lower slot 68 separates support block 42 and pawl member 50 so that pawl member 50 may move relative to support block 42.

Figure 5:
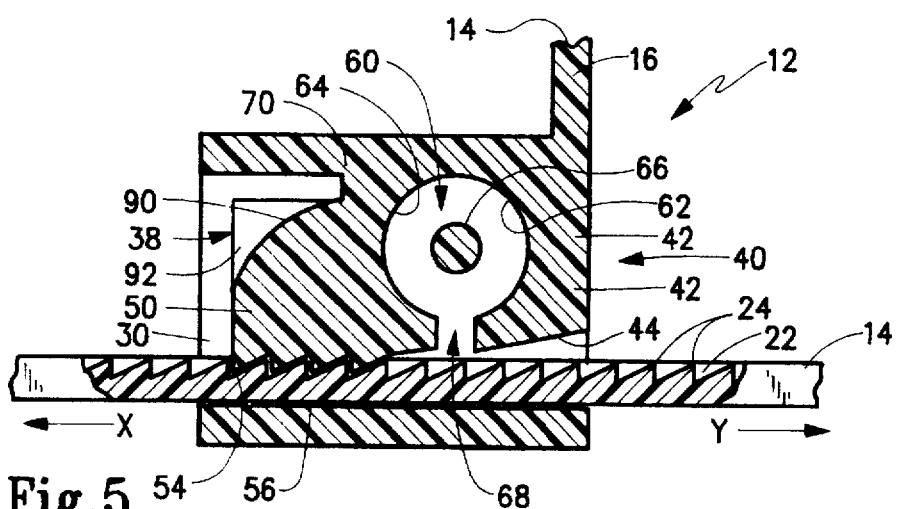
FIG. 5 is a cross-sectional view, taken about lines 5—5 of FIG. 4 and with a strap portion therein showing the pawl member in a locking position.
Figure 6:
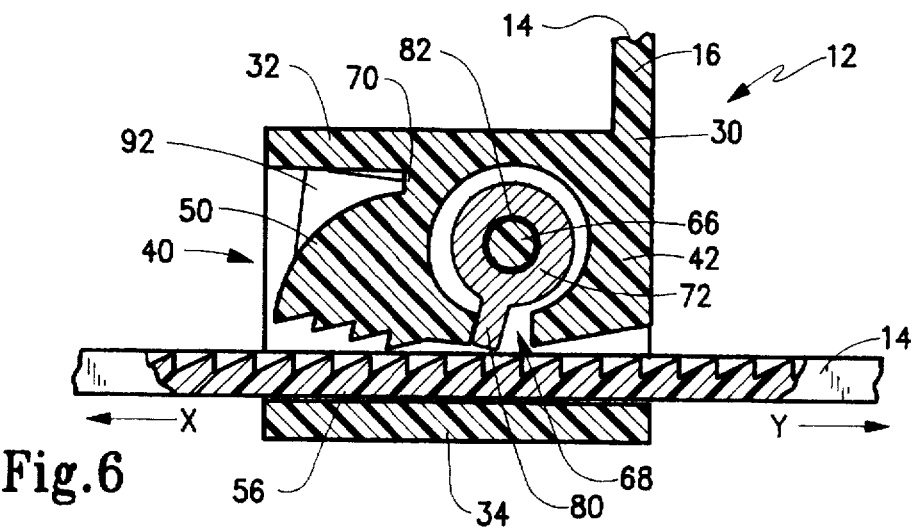
FIG. 6 is a side view in cross-section, similar to FIG. 5, but showing the pawl member in a released position and with a key element inserted therein.

With reference, then, to FIGS. 5 and 6, it may be seen that pawl member 50 is connected to upper wall 32 by means of a hinge structure 70 that is relatively reduced in dimension from the thickness of either support block 42 or the remainder of pawl member 50. This permits pawl member 50 to pivot between a locking position, as is shown in FIG. 5, and a released position, as is shown in FIG. 6. To this end, it may be seen in FIGS. 5 and 6, that slideway 56 is sized for close-fitting mated engagement with strap portion 14 with strap portion 14 being moveable therethrough in a first direction "X" that is operative to reduce the dimension of securing loop 20 and in a second direction "Y" that is opposite direction "X" and which is operative to expand the dimension of securing loop 20.

Locking head portion 12 along with support block 42 and pawl member 50 are preferably formed of a relatively stiff plastic material but, due to the dimensional thickness of hinge structure 70, hinge structure 70 serves to bias pawl member 50 into the locking position shown in FIG. 5. Thus, as strap portion 14 is moved in the direction "X" the locking structure on pawl member 50, as exemplified by ratchet teeth 54, are operative to engage teeth 24 on first surface 22 in a ratcheting manner thereby permitting movement in the direction "X" but prohibiting opposite movement in the direction "Y". This, of course, allows the securing loop 20 to be reduced in dimension, that is, tightened around an object to be secured.

A key 72, shown in FIGS. 1 and 6, is provided to move pawl member 50 into the release position shown in FIG. 6. To this end, key 72 includes a shank or barrel 74 and a head 76 opposite an end 78 that supports a tab 80. Barrel 74 includes an axial bore 82 that extends inwardly of end 78 with bore 82 sized to matably engage post 66, as is shown in FIG. 6. One of sidewalls 36, as is shown in FIG. 1, is provided with a keyhole 84 formed therethrough that is aligned with keyway 60 to allow insertion of key 72 into the interior of locking head 12 along transverse action "T". As is shown in FIG. 6, tab 80 extends into slot 68 and, upon clockwise rotation of key 72 acts to bear against pawl member 50 and to urge pawl member 50 into the released position against the resiliency of hinge 70. When key 72 is rotated into the counterclockwise position and withdrawn from keyway 60, the resiliency of hinge structure 60 causes pawl member 50 to return to the locking position shown in FIG. 5.

In use, then, strap 14 is looped around objects to be secured, and distal free end 18 is inserted into locking head 12. Where, for example, a person is to be retained in custody, strap 14 may be looped around the crossed wrists and distal free end 18 is then inserted through locking head 12. End 18 is then pulled through locking head 12 to reduce the dimensional size of securing loop 20 until it fits snugly around the objects to be retained. During this time, the locking structure of pawl member 50 engages the ratchet teeth on surface 22 of strap 18 so that the size of securing loop 20 may be incrementally reduced by the length of each ratchet tooth 24, which is typically 1–3 millimeters (0.01 inch) or less. If securing loop 20 is secured too snugly, key 72 may be inserted to release pawl member 50 thereby allowing securing loop 20 increase in size a desired amount. Upon rotational release of key 72, securing loop 20 will thereafter become lockably retained in the adjusted position. Moreover, to fully release restraining device 10, the user holds key 72 in the rotated position shown in FIG. 6 while withdrawing strap 14 completely from locking head 12 in the direction "Y".

It should now further be appreciated that insertion of distal free end 18 is facilitate both by means of its tapered shaped, shown in FIG. 1, and by the divergent entryway 58 into slideway 56. Moreover, to obtain a smooth motion with positive engagement, it may be further appreciated that smooth, uninterrupted second surface 26 of strap 14 will slideably engaged smooth uninterrupted interior wall surface 46 as strap 14 moves through locking head portion 12. In addition, to prevent over torquing and undue fatigue on hinge structure 70, it may be seen in reference to FIGS. 2, 5 and 6 that pawl member 50 has an arcuate center portion 90 which is flanked by a pair of transversely opposed shoulders 92 which will contact the interior of upper wall 32 when pawl member 50 is moved into the locking position. By providing the locking structure in the form of support block 42 and pawl member 50 which are split from one another by means of keyway 60 and lower slot 68, a positive engagement of key 72 is accomplished in the keyway and by virtue of mated engagement of bore 82 with transverse post 66. The provision of support block 42 also diminishes the likelihood that an instrument may be inserted into the interior 38 of housing 30 to manipulate pawl member 50 into the released position.

Figure 8:
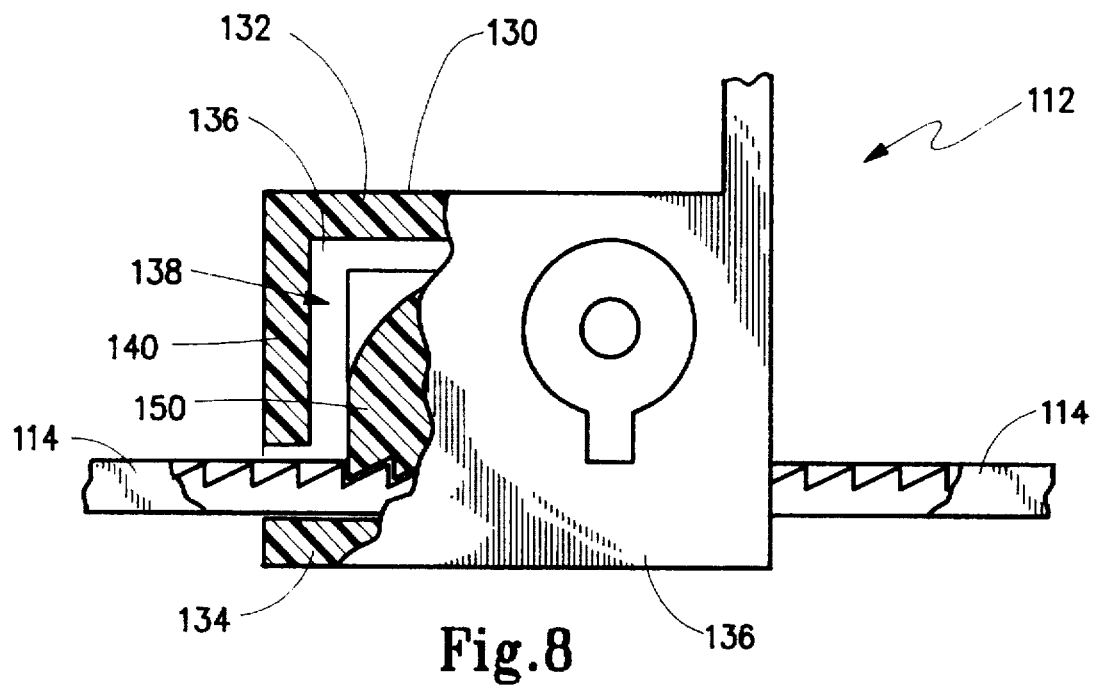
FIG. 8 is a side view, partially broken-away, of a locking head according to a modified embodiment of the present invention.
Figure 9:
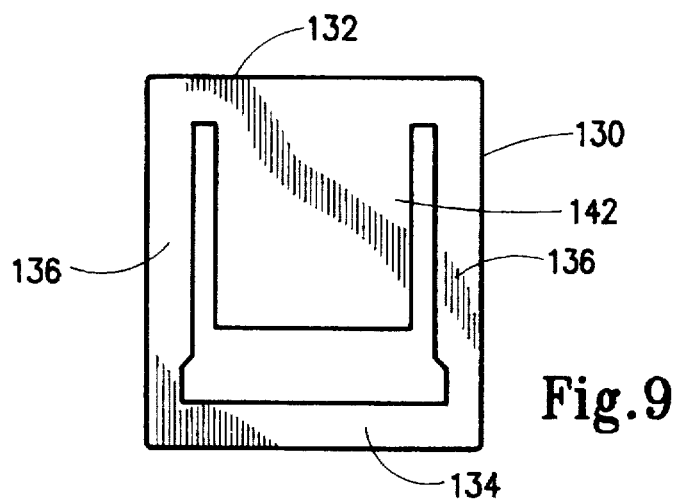
FIG. 9 is an end view in elevation, similar to FIG. 2 showing the alternative locking head of FIG. 8.

To further prevent insertion of instruments to "pick" locking structure 40, an alternative embodiment of the present invention is shown in FIG. 8 and 9. Here, it may be seen that locking head 112 is formed as a housing 130 that includes upper wall 132, lower wall 134 and a pair of sidewalls 136 which surround an interior 138. Here, however, an additional endwall 140 downwardly depends from an end of upper wall 132 that is opposite the support block 142 with endwall terminating in spaced apart from wall 134 a sufficient distance to allow unrestricted passage of strap 114 therethrough. Accordingly, support block 142 acts to substantially enclose one end of housing 130 while endwall 142 acts to substantially enclose the opposite end of housing 130. In this manner, the ability to manipulate pawl member 150 by an instrument other than key 72 is restricted.

As noted above, it is desirable to construct restraining device 10 out of an integral one piece molded plastic construction. Here, of course, care must be taken to properly form a split mold, such as a plastic injection mold, so that the structure described above may be formed in a single operation. To this end, it is preferred that the mold include a pair of confronting sections in a single slide, as hereinafter described.

Figure 10:
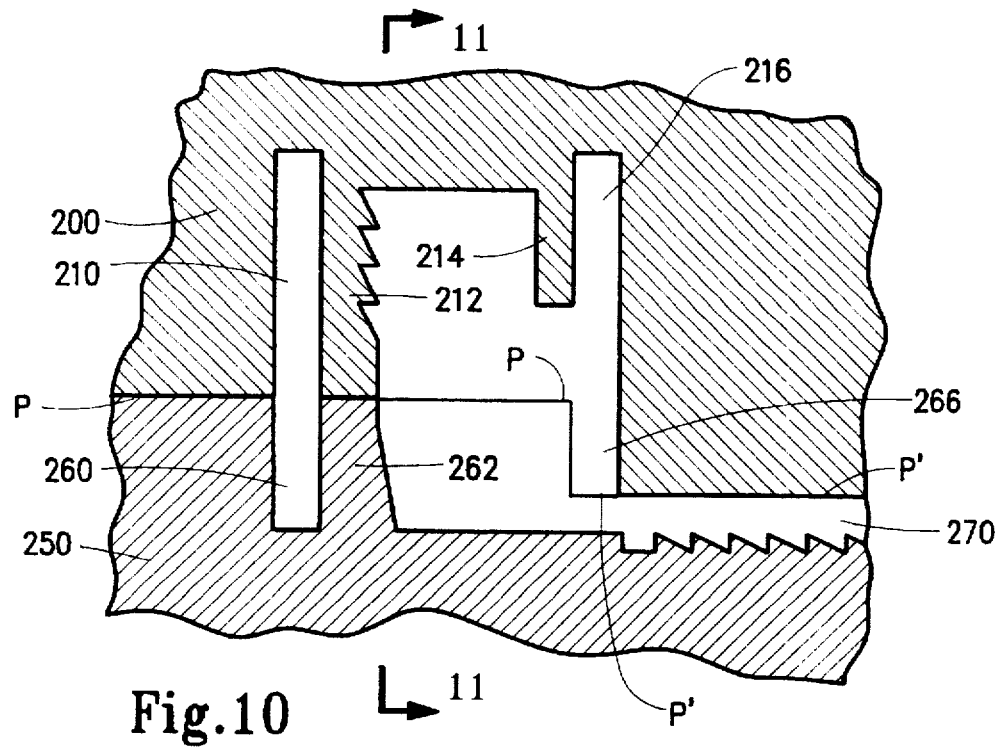
FIG. 10 is a diagrammatic view of a molding head used to mold the key operated restraining device according to the present invention.
Figure 11:
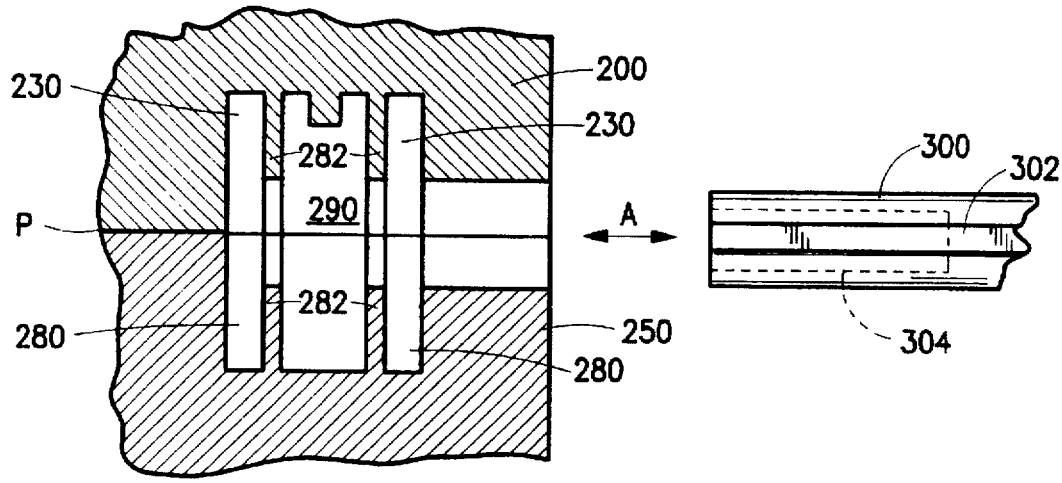
FIG. 11 is a second diagrammatic view showing the molding assembly used to produce the key operated restraining device according to the first exemplary embodiment of the present invention.
Figure 12:
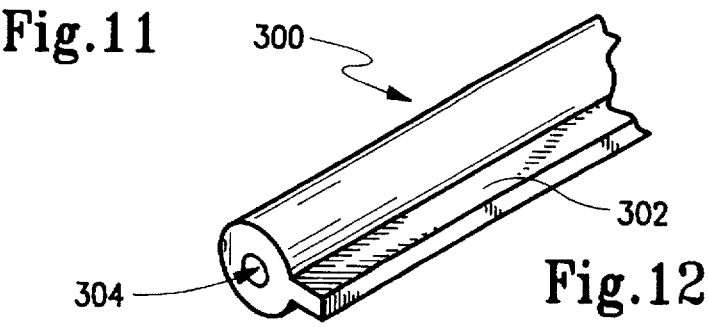
FIG. 12 is a perspective view of a slide used with the molds of FIGS. 10 and 11.

Turning to FIGS. 10–12, a diagrammatic representation of the mold used to produce the restraint device 10 according to the exemplary embodiment of the present invention is shown. In these Figures, it may be seen that an upper mold section 200 is adapted to cooperate with a lower mold section 250 to produce a locking head portion 12 and strap portion 14. To this end, upper and lower mold sections 200, 250 include first cavities 210, 260 which register with one another to form lower wall 34. Upper mold section 200 includes molding piece 212 which forms a portion of the slideway 56 along with element 262 of lower mold section 250. Element 212 forms the teeth (locking structure) on pawl element 50 while element 262 forms the enlarged entryway 58. Molding element 214 of upper mold section 200 is provided to form an open region and, thus, hinge structure 70. Cavity portions 216 and 266 are provided to form upper wall 32 with lower mold 250 having an elongated cavity 270 which molds strap portion 14 along with teeth 24 thereon.

With reference to FIG. 11, it may be seen that upper mold section 200 and lower mold section 250 include a pair of cavities 230 and 280 which align with one another to form sidewalls 36, and elements 232 and 282 are provided to form the open regions between pawl element 50 and support block 42 and sidewalls 36. In order to form keyway 60 and post 66, as is shown in FIG. 11, a slide 300 is provided which includes a rectangular protrusion 302 which forms slot 68. Slide 300 reciprocates in the direction of arrow "A" so that it may extend into central cavity region 290 formed when upper mold section 200 and lower mold section 250 come together. Slide 300 is shown in FIG. 12 and includes an axial bore 304 which forms posts 66.

It is important in the fabrication of restraining device 10 as an integral piece that mold sections 200 and 250 may move together and apart about the molded structure thereof. To this end, it is important that mold sections 200, 250 have a primary break or plane of separation "P" that contains the transverse axis "T" of center post 66. However, since strap portion 260 lies out of this plane, it is necessary to step the break plane, at "P" so that separation of mold sections 200, 250 allow the molded part to be removed. This, of course, could be eliminated by making strap portion 14 in the plane of axis "T".

In any event, mold sections 200, 250 are brought together, as is shown in FIGS. 10 and 11, with slide 300 being inserted into cavity 290. Thereafter, molten plastic is injected into the cavities to create locking head portion 12 and strap portion 14, including the locking structure 40 described above. When this plastic sets, slide 300 is withdrawn and mold sections 200, 250 may be separated to eject the finished restraining device. Of course, modifications to the construction of this mold should be readily apparent to the ordinarily skilled person in this field, based upon the teachings herein.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiment of the present invention without departing from the inventive concepts contained herein.

I claim:

1. A key operated restraining device adapted to create a securing loop of adjustable dimension, comprising:

(a) a locking head portion having an interior;

(b) an elongated strap portion having a proximal end connected to said head portion and a distal free end, said strap portion including a plurality of tooth structures disposed on a first surface thereof, said strap portion having sufficient length such that said free distal end is insertable through said locking head portion thereby to form a securing loop of adjustable dimension;

(c) a support block disposed in the interior of said head portion and terminating in spaced relation to an interior wall surface thereof; and (d) a pawl member disposed in the interior of said head portion and terminating in spaced relation to said wall surface, said pawl member including a locking structure disposed thereon, said pawl member, said support block and said wall forming a slideway sized for close-fitting mated engagement with said strap portion, said strap portion being slideably movable in a first direction to reduce the dimension of said securing loop and in a second direction to expand the dimension of said securing loop, said pawl member connected to said locking head by a resilient hinge structure biasing said pawl member into a locking position wherein said locking structure is operative to lockably engage said tooth structures and a release position wherein said locking structure is disengaged from said tooth structures, said pawl member operative when in the locking position to permit ratcheting movement of said strap in the first direction but to prevent movement of said strap in the second direction, said pawl member and said support block configured to form a keyway therebetween sized and adapted to receive said key therein, said pawl member constructed such that rotation of said key in a first rotational direction moves said pawl element from the locking position to the release position.

2. A key operated restraining device according to claim 1 wherein the keyway is oriented along a keyway axis that is transverse to said slideway and including a post element that is located centrally in the keyway and that extends along the keyway axis.

3. A key operated restraining device according to claim 1 wherein said locking head includes an upper wall, a lower wall opposite said upper wall and a pair of opposed sidewalls interconnecting said upper and lower walls thereby to define the interior of said locking head, said support block and said pawl member being connected to said upper wall such that said slideway is defined by a region between said lower wall and said support block and said pawl member, and wherein said strap member extends outwardly from said upper wall.

4. A key operated restraining device according to claim 3 wherein one of said sidewalls has a key opening formed therethrough which is aligned with said keyway thereby to permit insertion of said key therein, said key opening operative to support said key during rotation thereof in said keyway.

5. A key operated restraining device according to claim 3 wherein said support block forms a first endwall for said locking head.

6. A key operated restraining device according to claim 5 including a second endwall located oppositely of said support block.

7. A key operated restraining device according to claim 3 wherein said lower wall defines the interior wall surface, the interior wall surface being formed as a smooth, uninterrupted planar surface, said strap portion having a second surface opposite the first surface that is formed as a smooth, uninterrupted planar surface adapted for sliding engagement with the interior wall surface.

8. A key operated restraining device according to claim 1 wherein a portion of the region located between said interior wall surface and said support block is outwardly divergent thereby to form an enlarged entryway for the slideway.

9. A key operated restraining device according to claim 1 wherein said locking structure includes a plurality of ratchet teeth such that, when said pawl member is in the locking position with said strap portion located within the slideway, said ratchet teeth engage a plurality of said tooth structures thereon.

10. A key operated restraining device adapted to create a securing loop of adjustable dimension, comprising:

(a) a locking head portion having an interior;

(b) an elongated strap portion having a proximal end connected to said head portion and a distal free end, said strap portion including a plurality of tooth structures disposed on a first surface thereof, said strap portion having sufficient length such that said free distal end is insertable through said locking head portion thereby to form a securing loop of adjustable dimension;

(c) a support block disposed in the interior of said head portion and terminating in spaced relation to an interior wall surface thereof; and (d) a pawl member disposed in the interior of said head portion and terminating in spaced relation to said wall surface, said pawl member including a locking structure disposed thereon, said pawl member, said support block and said wall forming a slideway sized for close-fitting mated engagement with said strap portion, said strap portion being slideably movable in a first direction to reduce the dimension of said securing loop and in a second direction to expand the dimension of said securing loop, said pawl member connected to said locking head by a resilient hinge structure biasing said pawl member into a locking position wherein said locking structure is operative to lockably engage said tooth structures and a release position wherein said locking structure is disengaged from said tooth structures, said pawl member operative when in the locking position to permit ratcheting movement of said strap in the first direction but to prevent movement of said strap in the second direction, said pawl member and said support block configured to form a keyway therebetween sized and adapted to receive said key therein, said keyway oriented along a keyway axis that is transverse to said slideway and including a post element that is located centrally in the keyway and that extends along the keyway axis, said pawl member constructed such that rotation of said key in a first rotational direction moves said pawl element from the locking position to the release position, said locking head, said strap portion, said support block, said pawl member and said post are formed as an integral one-piece molded construction of plastic material.

* * * * *